Jan. 16, 1945.  M. A. DRESSER  2,367,341

PHOTOGRAMMETRY

Filed April 22, 1943.  3 Sheets-Sheet 1

Myron A. Dresser, Inventor
By Ph. Young Attorney

Jan. 16, 1945.   M. A. DRESSER   2,367,341
PHOTOGRAMMETRY
Filed April 22, 1943    3 Sheets-Sheet 2

Myron A. Dresser, Inventor
By ⎯⎯⎯⎯ Attorney

Jan. 16, 1945.  M. A. DRESSER  2,367,341
PHOTOGRAMMETRY
Filed April 22, 1943  3 Sheets-Sheet 3

Myron A. Dresser, Inventor
By P. L. Young Attorney

Patented Jan. 16, 1945

2,367,341

UNITED STATES PATENT OFFICE 2,367,341

PHOTOGRAMMETRY

Myron A. Dresser, Mamaroneck, N. Y., assignor to Standard Oil Development Company, a corporation of Delaware Application April 22, 1943, Serial No. 484,032

9 Claims. (Cl. 33—1)

This invention pertains to an improved method of making controlled index mosaic maps from vertical aerial photographs and involves an entirely new approach to the problem of relating points on the photographs to their true position on the earth's surface as shown by a base map projection on a definite scale of the area covered by the photographs.

It is the object of this invention to provide the art with an improved method of making controlled index mosaic maps from vertical aerial photographs.

It is a further object of this invention to provide the art with a method of making controlled index mosaic maps from vertical aerial photographs without the use of templets, radial arms or other guides which interfere with direct examination of the assembled photographs.

These and other objects will appear more clearly from the detailed description and claims which follow.

Numerous methods of making maps from aerial photographs are well known. Such methods include the radial line method, the "Bagley method," the "Arundel method," radial triangulation, the "Fairchild slotted templet method" and the "King radial triangulation method." Since the present method is an improvement over the "Fairchild slotted templet method," covered by U. S. Patent No. 2,102,612, the latter will be described in some detail in order to show the advantages of the former.

In preparing a map from vertical aerial photographs it is necessary first to take a series of photographs of the area to be mapped at the same or as close to the same altitude as is practicable. Ordinarily flight lines are arranged over the area to be mapped in such a way that photographs taken along one line will overlap those taken on the adjoining line by 25-35% of the width of the photograph. The photographs are taken at sufficient intervals that the overlap between consecutive photographs is 55-65% of the length of the photograph. The several photographs are numbered as taken. These steps are common to the several methods of making maps mentioned above.

In order to assemble the numerous photographs into a composite or mosaic picture of the map area, it is necessary to prepare a base map projection for the area to the desired scale. The plotting of the map is that of a polyconic projection or any other projection satisfactory for portraying the earth's surface upon a map. Certain ground control points which can be easily recognized in the photographs, the correct positions of which are accurately known from ground surveying work are selected across the ends of the area to be mapped and marked on the map projection. Control studs are set on the ground control points and are fastened in place with Scotch tape or other securing means.

The principal point or the mathematical center of each photograph is located. If the principal point of the photograph does not fall upon a sharp, well-defined image of an object in the photograph, a substitute center comprising such an object within a tenth of an inch of the principal point is chosen so that this point can be easily transferred from one overlapping print to another. There are then chosen a plurality of reference or control points on each photograph which are sharp, well-defined images of objects which may be readily identified in the several photographs in which said objects appear. These reference or control points also include the ground control points mentioned above. The several points so chosen are circled and marked with suitable identifying indicia.

Each photograph is then fastened securely to a templet or sheet of cardboard, aluminum or the like. The center point and the several reference or control points are then marked on the templet by pressing a pin perpendicularly through the respective points on the photograph into the templet. The photograph is then removed and the several pin points on the templet are circled and the number and other identifying indicia copied from the photograph onto the templet. A center hole of the desired diameter is punched out of the templet and radial slots are cut out of the templet along radial lines from the center to the several reference or control points. The slots are large enough and extend a sufficient distance each side of the reference point to provide for differences in scale and displacement of images due to varying relief ordinarily encountered in photographs of any area to be mapped.

The templets with the center holes and radial slots punched therein are then assembled on the base map, fitting the templets onto the appropriate ground control studs anchored to the base map and putting free or floating studs in the radial slots and at the center points of the several templets. The free studs ride in the radial slots and the templets are automatically shifted into their final positions by the action of the studs sliding in the slots and the templets pivoting about the anchored studs. When all the templets have been assembled on the base map and pressed flat or manipulated in such a way as to overcome friction thereby permitting the studs to slide in the slots, the several studs will be located at the true position of the several reference points. The templets are now in position and a needle is pressed down through a center hole in each of the studs to prick the true position of the center points and reference points onto the base map.

The templets are then removed from the base map one at a time. As each templet is removed, the center point and reference points pricked on the base map are located, circled and numbered corresponding to the number on the templets and corresponding photographs. When all the templets are removed and the true location of the center points and reference points have been marked on the base map, the original photographs are substituted for the templets in the position the templets occupied and in the orientation determined by the location of the points transferred from the templets to the base map. When all the photographs are laid down in their correct positions they are cemented in place using either rubber cement or a paste made of gum arabic as the adhesive. The resulting map is commonly known as a controlled index mosaic. Each center point is in its correct position for the scale used and the photographs are correctly oriented with respect to each other.

The method in accordance with the present invention is much shorter, simpler and just as accurate, if not more accurate, than the Fairchild slotted templet method. In accordance with the present invention, a controlled index mosaic is obtained by preparing a base map projection for the area to the approximate scale of the photographs with removable control studs set on the ground control points, selecting and circling center points and reference points and circling the ground control points on the photographs, punching center holes and radial perforations to reference points and ground control points and assembling the photographs on the base map, putting in the removable control studs at the radial perforations and fitting photographs over the removable control studs on the ground control points on the base map. There is thus obtained in some four steps, a controlled index mosaic map that is comparable with that obtainable in accordance with the "Fairchild slotted templet method" in eleven steps.

Reference is made to the accompanying drawings which are illustrative of one embodiment of the present invention. In the drawings, Figure 1 represents three aerial photographs taken along a line of flight with an overlap of approximately 60% along the line of flight.

Figure 1:
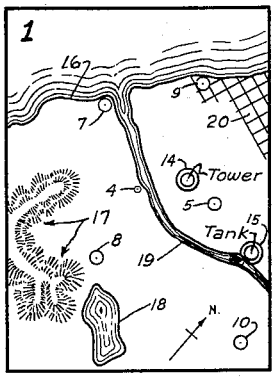
Figure 1:
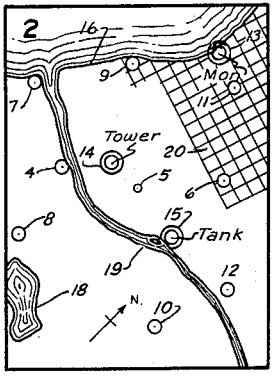
Figure 1:
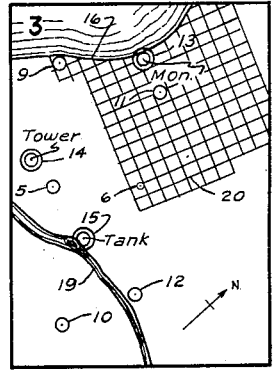

In Figure 1 there are shown three vertical aerial photographs, 1, 2 and 3 taken along a line of flight from southwest to northeast with an overlap of approximately 60% along the line of flight. The overlap is required so that the new application of radial control described below may be used to place these photographs in their correct position with reference to each other on a projection of the earth's surface. In addition to this overlap along the line of flight provision is also made for lateral overlap in photographing a given area. In other words, if the given area to be mapped is extended in an easterly direction, additional flight strips would be flown parallel to the one from which these photographs were taken. The photographs of each flight strip would overlap those of the adjoining strip by about 30%. This lateral overlapping is not for stereoscopic study but for the purpose of tying the strips of photographs together by means of picture control points common to the photographs of adjoining strips. These photographs, taken along a coastline 16 show mountains 17, a lake 18, a river 19 and a town 20.

Figure 2:
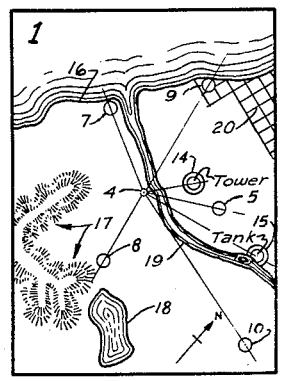
Figure 2 represents the same photographs of Figure 1 having markings thereon for the center of the photographs as well as ground control and reference or photo control points and radial lines drawn from the center to the several control points.
Figure 2:
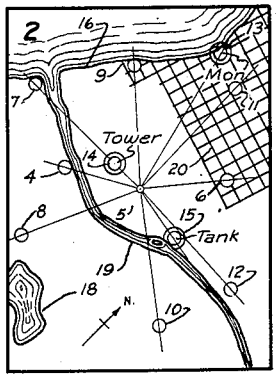
Figure 2:
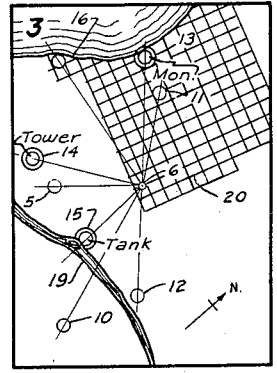

In Figure 2 there is shown the principal point or substitute centers 4, 5 and 6 of photographs 1, 2 and 3 respectively. Photo control points, 7, 8, 9, 10, 11 and 12 which are sharp well defined images that appear in at least two of the photographs are selected, circled and, for illustrative purposes, numbered. The principal points or substitute centers of the adjoining photographs are also circled and numbered on each photograph.

Ground control points 13, 14 and 15 which are respectively a monument, a tower and a tank, each of which is a sharp, well defined image of an object, the exact position of which is known from ground survey work, are selected and circled.

On each of the photographs, radial lines are drawn from the principal point or substitute center to each of the control points circled thereon. When the radial lines have been drawn, a hole is punched in each of the photographs at the principal point or substitute center and radial slots are punched in the photographs by means of the punch and chisel shown in Figures 8 and 7 respectively. Drawing of radial lines is only for convenience when using the type of cutter illustrated. It will be obvious to those skilled in the art that other cutter arrangements are possible, with the cutter movable along radial lines whereby the actual drawing in of radial lines on the photographs would be unnecessary.

Figure 8:
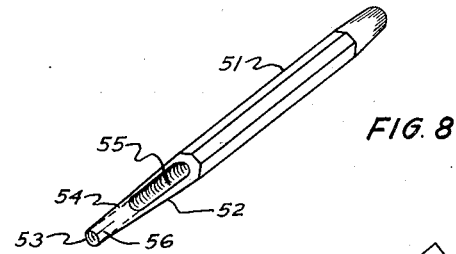
Figure 8 shows the punch which is used for cutting the holes at the principal points or at the substitute centers of the photographs.

The punch illustrated in Figure 8 comprises a body portion 51 and a gradually tapered end 52 which terminates in a round cutting edge 53 having an outside diameter which is the same or substantially the same as the outside diameter of the hollow shaft of the control studs. In order to facilitate removal of the punchings from the punch, a cylindrical opening 54 extends longitudinally from the cutting edge to the lateral opening 55. Four marks 56 are provided on the edge of the chisel at 90° intervals to permit centering of the punch over the principal point or substitute center of the photograph.

Figure 7:
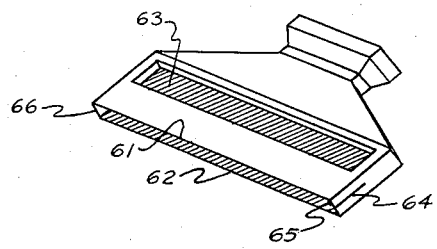
Figure 7 is an isometric view of the chisel for cutting the radial slots.

The chisel shown in Figure 7 is provided with four cutting edges, the long cutting edges 61 and 62 being spaced apart a distance substantially equal to the outside diameter of the control studs in order that there will be no lateral play or movement between the photograph and the control studs. As shown in the drawings, an opening is provided inside the chisel from the cutting edge to a lateral opening or slot 63 in order that means may be inserted to force the cuttings from the photographs out of the chisel. A line or mark 64 is provided at the middle of each of the end cutting edges 65 and 66 in order that the chisel may be exactly centered on the radial lines on the photographs.

Figure 3:
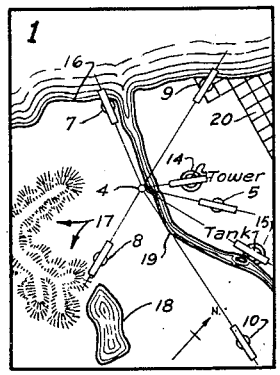
Figure 3 represents the same photographs having the center hole and the radial slots punched out.
Figure 3:
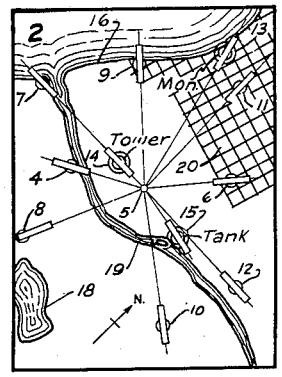
Figure 3:
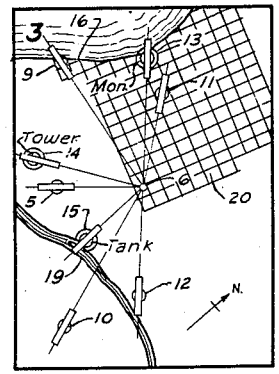

The cutting of center holes and radial slots is effected by carefully centering the appropriate cutting tool over the principal point or control point and striking the tool with a hammer or the like. The photograph is supported in a suitable manner in order that the holes and radial slots will be cut cleanly without any tearing of the edges. The cuttings from each photograph are saved in a suitably marked envelope or the like in order that the cuttings may be restored to the photographs as described below. Figure 3 illustrates the same photographs as shown in Figures 1 and 2 with center holes and radial slots punched out.

Figure 4:
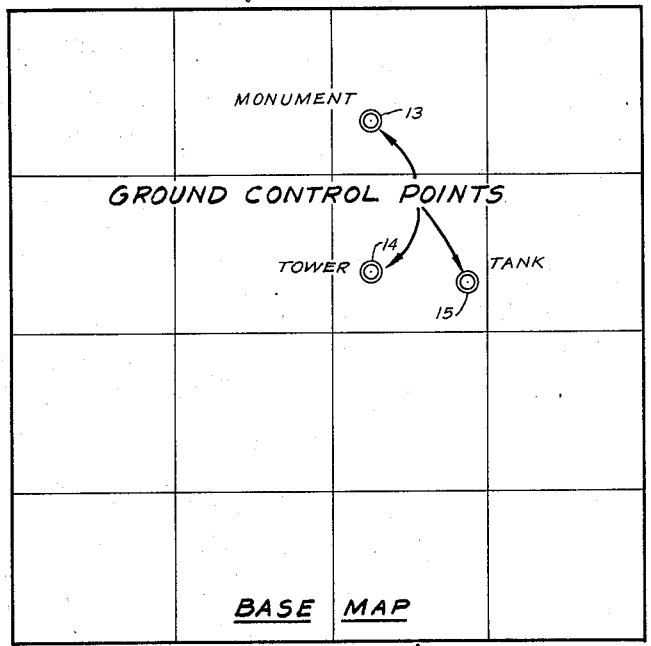
Figure 4 represents a base map plotted as a polyconic projection or any other projection satisfactory for portraying the earth's surface upon a map, having the ground control points marked thereon.

When the center holes and radial slots have been cut from the photographs, the latter are assembled on the base map, the photographs being placed on the map in such a way that the proper radial perforations coincide with and slip down over the studs affixed to the base map at the ground control points. Figure 4 shows a base map of the area photographed plotted as a polyconic projection. The ground control points, namely, monument 13, tower 14 and tank 15 are shown in their true position as determined by ground survey work. A control stud 70 is affixed to each of the ground control points by means of cement, Scotch tape or the like.

Free moving control studs are placed at each of the picture control points and studs are also placed in the subcenter holes. When all the photographs are assembled and overlapping photographs are interlocked by the control studs, the latter will be in the correct position for the several reference points. The correct position of these points may be marked on the base map by passing the marking pin or spot pricker 73 down through the opening in the vertical shaft 71 of the control stud in order to pierce a hole in the base map at that point.

Figure 5:
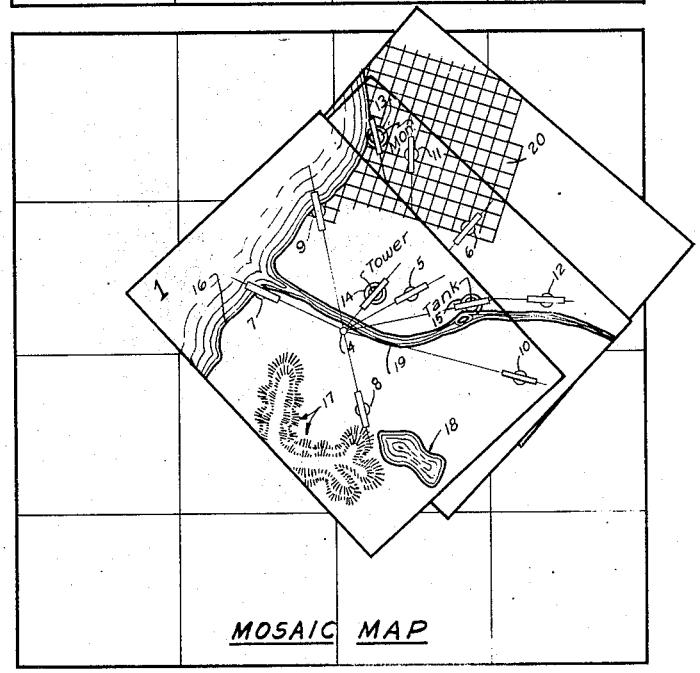
Figure 5 is a vertical view of the mosaic obtained by assembling the perforated photographs on the base map.
Figure 6:
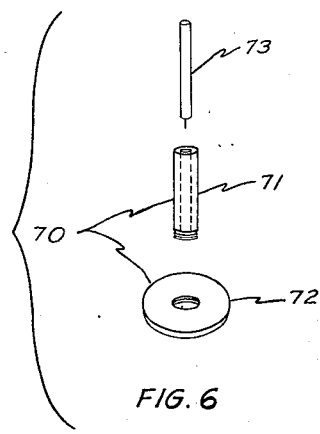
Figure 6 is an exploded view of the removable control stud and marking pin that is used therewith.

Figure 5 is a vertical view of the mosaic obtained by assembling the perforated photographs on the base map. At this point, there is obtained in some four steps a controlled index mosaic which is equivalent to the mosaic obtainable by the "Fairchild slotted templet method" in eleven steps.

In cases where a finished controlled index mosaic is needed for photographic reproduction on the same or a smaller scale this may be easily prepared from this assembly. The photographs are stapled or cemented in their assembled position on the base map. The vertical shaft 71 is then unscrewed from the base plate 72 of the control stud. The center hole and the radial slot cuttings from the uppermost photographs are then replaced in their proper places. The correct position of reference points can be added to the strips replaced and circled so that these ground positions are available for reference on the finished mosaic. In this manner not only are the individual photographs correctly oriented with respect to each other, and the center points correctly located, but the true ground location of the reference points may also be shown on the finished index mosaic along with the image location of the reference points, which fall on the same radial lines as the correct locations. No provision is made in the Fairchild templet method for providing the true location of the reference points on the final map. The usual procedure with slotted templets is to rephotograph the print to such a scale that the image points of the reference points will coincide with their true position. This assumes that the intervening points between the reference points are on the same topographic plane, which is rarely the case. For most map purposes it is thought better to have the true position of the reference points marked on the photograph, as in the method developed here, thus showing the observer the amount of image displacement on the photograph at that point.

One of the greatest practical disadvantages of the "Fairchild slotted templet method" is the problem of finding reference points that have been pricked through onto the base map in order that the photographs may be laid down in their true or correct positions. In theory, when the lowermost templet is removed from the base map, the control studs are supposed to remain in place so that the prick point may be easily found beneath the loose stud. However, when the templets are picked up, the shaft of the control stud usually binds enough in its slot to move the stud out of its true position, thereby causing the operator to spend considerable time searching for pin holes in the base map. This difficulty is completely avoided by my process because of the fact that no templets are used and it is not necessary to remove the photographs from their position on the base map, once they have been assembled.

A further disadvantage of the slotted templet method is that either after the templets have been assembled or after the photographs have been assembled, it is very difficult to obtain the true position of any other objects in the photographs not already located as reference points. In order to obtain true map locations of other objects not previously located by the slotted templet method it is necessary to take down the templet assembly, select the point to be transferred on the three photographs on which it appears, bind the templets to the corresponding photographs, prick the newly selected point through to the templet, cut radial slots to the reference points on each of the three templets, reassemble the templets on the base map control and pierce the base map at the position occupied by the control stud inserted in the added slots.

Figure 9:
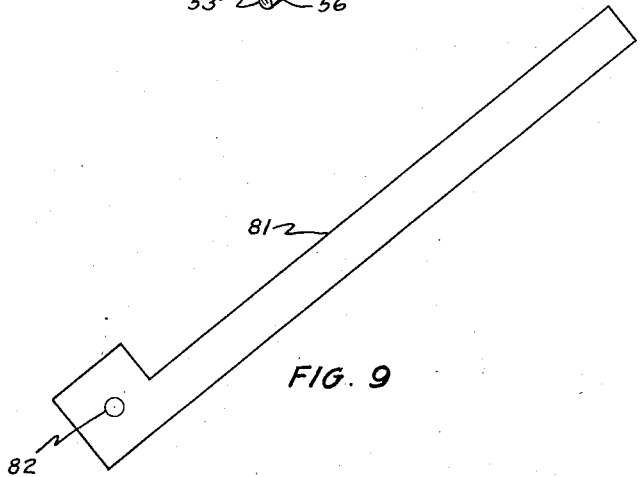
Figure 9 is a radial line ruler which may be slipped over the center posts of the studs in order to aid in obtaining the true ground location of any image point on the overlapping photographs.

The method in accordance with the present invention permits one to obtain the true location of any object shown on the photographs in an extremely simple manner using an easily made radial line ruler such as shown in Figure 9. This ruler, which may be made of Celluloid of some similar transparent material, is made in the form of a letter L as shown, or in any other convenient form, the essential feature being that the ruler have at least one straight edge 81 which, if extended, would pass exactly through the center of the hole 82 provided in the rule. The hole 82 is of the same diameter as the outside diameter of the vertical shaft 71 of the control studs. In order to obtain the true ground location of any desired object after the photographs have been assembled as shown in Figure 5, a ruler of the type described is slipped over the center post of each of the three overlapping photographs and a radial line is drawn from the center to the image point on the uppermost photograph. A radial reference line is projected past the point to be located from the centers of each of the underlying photographs beyond the edges of the overlying photograph. The three lines are then connected on the top photograph to give a three point intersection thereon which is the true location of the point. A number of these locations may be made on the assembled perforated photographs and taken off the photographs to make a planimetric map by superimposing a transparent base map of the area over the photographs.

If it should be found desirable to locate the additional reference points on the base map upon which the photographs are assembled, this may be done by simply piercing these points through the photographs to the base map with a fine needle or, if more convenient, they may be traced from the photographs to an overlying transparent base map or section of such a map.

Since the method of my invention contemplates using only the picture, that is, the map area itself, it is equally effective if the negative film is used instead of the photographs. If the film negatives are used, my process is carried out as follows:

A base map of the area is prepared on some transparent material such as cellulose acetate or the like to the approximate scale of the photographs. Ground control points, the exact location of which are known from ground survey work, are circled and labeled. The base map is then inverted and control studs are set over the known ground control points on the reverse side of the base map. The steps mentioned below are carried out on the inverted map.

The center point of each of the negatives and several reference points which appear on adjoining negatives and the ground control points are located, circled and labeled. Radial lines are drawn from the center to each of the reference and ground control points. Holes are punched out of the center of each negative and a radial perforation or slot is cut to each of the reference and ground control points, the punchings being carefully saved for subsequent replacement in the negative.

The perforated negatives are then assembled on the inverted transparent base map fitting the appropriate radial slot over the studs on the known ground control points and placing free or floating studs in the center holes and at the several reference points. The perforated negatives are pressed flat against the base map, the floating studs sliding in the respective slots until they occupy the true position of the several centers and reference points. A pin is then passed down through the shaft of the control studs and a hole is pricked in the base map. After the negatives have been picked up, these points or true locations of reference points are then circled, preferably in a distinctive manner to distinguish them from the circles applied to the negatives and labeled on the base map, or, if so desired, the true location of the reference points can be circled and marked in a distinctive manner on the negative itself.

Since the respective images are offset with respect to each other on the different negatives, it is necessary to eliminate the overlapping of the negatives to obtain a composite negative from which prints may be made. The trimming of the prints may be done in several ways. For example, small punch holes are punched through the negatives not only to mark on the base map, but also to outline a central portion of each negative embracing the central part not overlapped and approximately one-half the overlap. The negatives are then picked up from the base map, and pencil lines on the emulsion side are drawn connecting the punch holes for trimming purposes. The negatives are then trimmed, preferably in a trimming machine, together with the radial inserts where necessary, and are replaced on and cemented to the transparent base map from which loose studs and taped studs have been removed.

Alternatively, the negatives may be cut without removing the negatives from the base map by securing the negatives in place on the base map, removing the control studs, restoring the center hole and radial slot cuttings to the respective negatives and carefully cutting through the several negatives without cutting the base map. Usually one-half of the overlap is cut from each of the negatives although it is obvious that this procedure need not be strictly adhered to since it may on occasion be desirable, if not necessary, to eliminate the overlapping by cutting more from one than from the other of the overlapping negatives.

From the several trimmed and fitted negatives there is obtained a controlled index mosaic negative from which as many contact prints as desired may be made. On these prints is shown the true position of the center points, and the true position and image position of the reference points, their true positions printing through from the circles on the base map. These prints will obviously be far superior to prints obtained by photographing the controlling index mosaic of prints and reprinting that photograph either by contact or projection since the latter, being a "picture of a picture" will lose much of the definition present in the original negative. It will also be apparent that by my process a negative mosaic assembly of any desired size may be built up and contact prints made directly therefrom.

The foregoing description contains a limited number of embodiments which are intended only to be illustrative of my invention since it will be apparent to those skilled in the art that numerous variations are possible without departing from the scope of the subjoined claims.

What I claim and desire to secure by Letters Patent is:

1. The method of making controlled index mosaic maps which comprises taking a series of overlapping photographs of a given area including ground control points the exact position of which are known from ground survey work, preparing a base map to the desired scale of the area to be covered by the mosaic, marking the ground control points on the map and affixing control studs to said points, locating the center of each of the photographs, locating and circling each of the ground control points appearing on the photographs, selecting and circling a plurality of reference points which are clear, well-defined images of objects that appear in two or more of the photographs, punching a hole at the center point of each of the photographs, punching a slot to each of the ground control and reference points which is exactly centered on a radial line from the center of the photograph to the respective ground control and reference points, assembling the photographs on the base control map fitting the radial slots to the ground control points over the stud affixed to the corresponding point on the base map, fitting a control stud into each of the center holes and inserting a floating stud at each of the reference points on the photographs thereby interconnecting the overlying photographs and adjusting the same so that a controlled index mosaic is obtained in which a control stud appears at the true position of each of the reference points chosen on the photographs.

2. The method of making controlled index mosaic maps which comprises taking a series of overlapping photographs of a given area including ground control points the exact position of which are known from ground survey work, preparing a base map to the desired scale of the area to be covered by the mosaic, marking the ground control points on the map and affixing control studs to said points, locating the center of each of the photographs, locating and circling each of the ground control points appearing on the photographs, selecting and circling a plurality of reference points which are clear, well-defined images of objects that appear in two or more of the photographs, punching a hole at the center point of each of the photographs, punching a slot to each of the ground control and reference points which is exactly centered on a radial line from the center of the photograph to the respective ground control and reference points, assembling the photographs on the base control map fitting the radial slots to the ground control points over the stud affixed to the corresponding point on the base map, fitting a control stud into each of the center holes and inserting a floating stud at each of the reference points on the photographs, manipulating the photographs to cause the floating studs to move in the respective slots until they reach the true position of the respective reference points on the base map and marking the true position of the reference points as shown by the control studs on the respective photographs.

3. The method of making controlled index mosaic maps which comprises taking a series of overlapping photographs of a given area including ground control points the exact position of which are known from ground survey work, preparing a base map to the desired scale of the area to be covered by the mosaic, marking the ground control points on the map and affixing control studs to said points, locating the center of each of the photographs, locating and circling each of the ground control points appearing on the photographs, selecting and circling a plurality of reference points which are clear, well-defined images of objects that appear in two or more of the photographs, punching a hole at the center point of each of the photographs, punching a slot to each of the ground control and reference points which is exactly centered on a radial line from the center of the photograph to the respective ground control and reference points, assembling the photographs on the base control map fitting the radial slots to the ground control points over the stud affixed to the corresponding point on the base map, fitting a control stud into each of the center holes and inserting a floating stud at each of the reference points on the photographs, manipulating the photographs to cause the floating studs to move in the respective slots until they reach the true position of the respective reference points on the base map, marking the true position of the reference points as shown by the control studs on the respective photographs, fastening the photographs securely to the base map, removing the control studs, reinserting the center hole and radial slot cuttings to the photographs from which they were taken, thereby forming a controlled index mosaic from which no strips or sections are missing and which shows both the true and the picture position of the reference points.

4. The method of making controlled index mosaic maps which comprises taking a series of overlapping photographs of a given area including ground control points the exact position of which are known, preparing a base map plotted as a polyconic projection to the desired scale of the area to be covered by the mosaic, marking the ground control points on the map and affixing control studs to said points, preparing prints of said photographs, locating the center point of each of the prints, locating and circling each of the ground control points appearing on the prints, selecting and circling a plurality of clear, well-defined images of objects that appear in two or more of the overlapping prints as reference points, punching a hole at the center point of each of the prints, punching a slot to each of the ground control and reference points which is exactly centered on a radial line from the center of the print to the respective ground control and reference points, assembling the prints on the base control map fitting the radial slots to the ground control points over the stud affixed to the corresponding point on the base map, inserting a control stud into each of the center holes and inserting a floating stud at each of the reference points on the prints thereby interconnecting the overlying prints and manipulating the prints to cause the floating studs to slide in the radial slots until they reach the true position of the several reference points and marking the true position of the reference points on the prints where the true position of the reference point as shown by the control studs differs perceptibly from the image position of the point.

5. The method of making controlled index mosaic maps which comprises taking a series of overlapping photographs of a given area including ground control points the exact position of which are known, preparing a base map plotted as a polyconic projection to the desired scale of the area to be covered by the mosaic, marking the ground control points on the map and affixing control studs to said points, preparing prints of said photographs, locating the center point of each of the prints, locating and circling each of the ground control points appearing on the prints, selecting and circling a plurality of clear, well-defined images of objects that appear in two or more of the overlapping prints as reference points, punching a hole at the center point of each of the prints, punching a slot to each of the ground control and reference points which is exactly centered on a radial line from the center of the print to the respective ground control and reference points, assembling the prints on the base control map fitting the radial slots to the ground control points over the stud affixed to the corresponding point on the base map, inserting a control stud into each of the center holes and inserting a floating stud at each of the reference points on the prints thereby interconnecting the overlying prints and manipulating the prints to cause the floating studs to slide in the radial slots until they reach the true position of the several reference points, marking the true position of the reference points on the prints where the true position of the reference point as shown by the control studs differs perceptibly from the image position of the point, fastening the photographs securely to the base map, removing the control studs, reinserting the center hole and radial slot cuttings to the photographs from which they were taken, thereby forming a controlled index mosaic from which no strips or sections are missing and which shows both the true position and the image position of the reference points.

6. The method of making controlled index mosaic maps which comprises taking a series of overlapping photographs of a given area including ground control points the exact position of which are known, preparing a base map to the desired scale on a transparent material, marking the ground control on the base map, inverting the base map and affixing control studs to the reverse side of the map at the ground control points, locating the center point of each of the film negatives, locating and circling each of the ground control points on the negatives, selecting and circling a plurality of clear well-defined images of objects that appear in two or more overlapping negatives as reference points, punching a hole at the center point of each of the negatives, punching a slot to each of the ground control and reference points which is exactly centered on a radial line from the center of the negative to the respective ground control and reference points, assembling the perforated negatives, emulsion side up, on the reverse side of the base map fitting the radial slots to the ground control points over the studs affixed to the corresponding points on the base map, inserting a control stud at each of the center holes and inserting a floating stud at each of the reference points on the negatives, thereby interconnecting the overlying negatives and manipulating the negatives to cause the floating studs to slide in the radial slots until they reach the true position of the several reference points.

7. The method of making controlled index mosaic maps which comprises taking a series of overlapping photographs of a given area including ground control points the exact position of which are known, preparing a base map to the desired scale on a transparent material, marking the ground control on the base map, inverting the base map and affixing control studs to the reverse side of the map at the ground control points, locating the center point of each of the film negatives, locating and circling each of the ground control points on the negatives, selecting and circling a plurality of clear well-defined images of objects that appear in two or more overlapping negatives as reference points, punching a hole at the center point of each of the negatives, punching a slot to each of the ground control and reference points which is exactly centered on a radial line from the center of the negative to the respective ground control and reference points, assembling the perforated negatives, emulsion side up, on the reverse side of the base map fitting the radial slots to the ground control points over the studs affixed to the corresponding points on the base map, inserting a control stud at each of the center holes and inserting a floating stud at each of the reference points on the negatives, thereby interconnecting the overlying negatives and manipulating the negatives to cause the floating studs to slide in the radial slots until they reach the true position of the several reference points, circling and marking the true position of the reference points as shown by the control studs on the base map in such a manner as to make the true position and the image position of the reference points distinguishable.

8. The method of making controlled index mosaic maps which comprises taking a series of overlapping photographs of a given area including ground control points the exact position of which are known, preparing a base map to the desired scale on a transparent material, marking the ground control on the base map, inverting the base map and affixing control studs to the reverse side of the map at the ground control points, locating the center point of each of the film negatives, locating and circling each of the ground control points on the negatives, selecting and circling a plurality of clear well-defined images of objects that appear in two or more overlapping negatives as reference points, punching a hole at the center point of each of the negatives, punching a slot to each of the ground control and reference points which is exactly centered on a radial line from the center of the negative to the respective ground control and reference points, assembling the perforated negatives, emulsion side up, on the reverse side of the base map fitting the radial slots to the ground control points over the studs affixed to the corresponding points on the base map, inserting a control stud at each of the center holes and inserting a floating stud at each of the reference points on the negatives, thereby interconnecting the overlying negatives and manipulating the negatives to cause the floating studs to slide in the radial slots until they reach the true position of the several reference points, marking the true position of the reference points as shown by the control studs on the base map and trimming the edges of the negatives to eliminate overlapping thereof.

9. The method of making controlled mosaic maps which comprises taking a series of overlapping photographs of a given area including ground control points the exact position of which are known, preparing a base map to the desired scale on a transparent material, marking the ground control on the base map, inverting the base map and affixing control studs to the reverse side of the map at the ground control points, locating the center point of each of the film negatives, locating and circling each of the ground control points on the negatives, selecting and circling a plurality of clear well-defined images of objects that appear in two or more overlapping negatives as reference points, punching a hole at the center point of each of the negatives, punching a slot to each of the ground control and reference points which is exactly centered on a radial line from the center of the negative to the respective ground control and reference points, assembling the perforated negatives, emulsion side up, on the reverse side of the base map fitting the radial slots to the ground control points over the studs affixed to the corresponding points on the base map, inserting a control stud at each of the center holes and inserting a floating stud at each of the reference points on the negatives, thereby interconnecting the overlying negatives and manipulating the negatives to cause the floating studs to slide in the radial slots until they reach the true position of the several reference points, marking the true position of the reference points as shown by the control studs on the base map, removing the control studs, restoring the cuttings removed from the negatives and trimming the edges of the negatives to eliminate overlapping thereof thereby forming a controlled index mosaic negative having the true positions of the reference points as well as the image positions marked thereon and from which contact prints may be made.

MYRON A. DRESSER.